UNITED STATES PATENT OFFICE.

BERNARD ENRIGHT, OF ALLENTOWN, PENNSYLVANIA.

REFRACTORY MATERIAL AND METHOD OF MAKING THE SAME.

1,319,056.  Specification of Letters Patent.  Patented Oct. 21, 1919.

No Drawing.  Application filed November 14, 1918.  Serial No. 262,515.

*To all whom it may concern:*

Be it known that I, BERNARD ENRIGHT, a citizen of the United States, residing at 233 N. 4th street, Allentown, in the county of Lehigh and State of Pennsylvania, have invented a certain new and useful Refractory Material and Method of Making the Same, of which the following is a specification.

My invention relates to the preparation of raw materials, such as dolomite for use in furnace linings of the character used in basic open hearth and basic Bessemer steel processes.

The purpose of my invention is to avoid free silica in the product, by combining the silica therein with calcium or magnesium to an extent previously unattainable; practically eliminating the corrosive action of the furnace slag upon the lining by performing preliminarily the chemical reaction which this slag would otherwise enter into with the lining. I accomplish this by grinding much the greater part, preferably 90% of the materials used to a fineness whose importance has not previously been appreciated but which greatly facilitates the chemical union of the silica with calcium and magnesium.

A further purpose is, by the same means, to reduce the time required for hard burning of the product, so that excellent results can be obtained with but a single burning operation, and giving a very hard non-hygroscopic product.

A further purpose is to reduce to a minimum the quantity of added fluxing agent required, making the product harder than was previously possible and raising its temperature of fusion.

As is well known, dolomite is a natural magnesian limestone, comprising carbonates of magnesium and calcium, along with various impurities of which silica, when in any considerable quantity, is the most objectionable. The reason for this is that the slag of the furnace attacks the lining, combining with the silica in it, destroying the lining and causing leakage and loss of metal treated.

The objection to a high silica content is so well known and well founded that a showing of a high percentage of silica by chemical test in the finished lining material has ordinarily been regarded by steel chemists as a fatal defect; but the conversion of the silica in my product from free or uncombined silica to silicates of calcium and magnesium is so complete, that my lining has proved successful and thoroughly safe from combination with the slag even where the percentage of silica in the finished product has been as high as ten or twelve per cent.

In the practice of my invention, I mix the roughly divided rock with a very small amount of iron ore, to increase the fusibility of the combination. If pure iron ore be used, three or four per cent. is sufficient for the purpose. If impure iron ore be used, slightly more is necessary. The quantity of added iron ore required may be reduced by the presence of iron oxid in the dolomite.

As the impurity of the iron ore consists largely of silica, the silica of both the dolomite and iron ore must be combined with the bases.

The roughly crushed dolomite and iron ore are next pulverized dry so that much the greater part will pass through a No. 200 screen: *i. e.*, a screen having 200 meshes to the linear inch. I have obtained excellent results with from 90% to 92% of the pulverized mass passing through such a screen and believe that the percentage of material passing through must be quite high to secure effective combination.

I then burn the pulverized dolomite and ore, preferably in a rotary kiln, at a high temperature, which with the fine subdivision noted, insures the chemical combination of substantially all of the silica with the bases calcium and magnesium to form silicates of calcium and magnesium, performing in the burning operation the chemical change which would otherwise take place between the slag and the silica of the lining. The temperature is preferably from 2700 to 3000 degrees F., substantially agreeing with the temperature of the steel furnace which is to be lined. Tests have shown that the free silica remaining is negligible, being only a fraction of 1%, if any.

The extreme fineness of the grinding with the high temperature of burning secure complete clinkering of substantially the entire mass with a minimum of iron ore and a maximum combination of the silica with calcium and magnesium, the product being made up of non-hygroscopic nodules of three quarters of an inch or less in size. Except to break up any large nodules which may exist into sizes of three-quarter inch or less, it is not necessary to treat my product further to make it ready for use in the lining of the furnaces. I save one burning operation generally regarded as necessary with other processes.

The extremely fine sub-division of much the larger part of the product as used by me is of great importance in hardening the grains or nodules in the product and freeing the material from slacking and swelling in the air; as the hygroscopic character of many of these products leads them to do.

Though my best results have been obtained with about 90% of the material passing through a No. 200 screen, I recognize that approaches thereto can be obtained with a smaller percentage through the same screen and approximately the same results can be obtained by a grinding such that a larger percentage of the ground material will pass through a slightly coarser screen. I, of course, intend to include such variations within the scope of my claims.

Having thus described my invention, what I claim as new and desire to secure by Letters Patent is:

1. A refractory material for furnace linings comprising dolomite initially having a considerable silica content, calcined, and as calcined containing calcium and magnesium silicates, with a negligible amount only of uncombined silica.

2. As an intermediate article of manufacture, mixed dolomite and iron ore of a fineness such that much the greater part of it will pass through a No. 200 screen.

3. As an intermediate article of manufacture, mixed dolomite and iron ore of a fineness such that approximately 90% of it will pass through a No. 200 screen.

4. The method of making refractory material for furnace linings from dolomite which consists in mixing the dolomite and a fluxing material, finely dividing the dolomite and fluxing material in dry condition so that much the greater part of the material will pass through a No. 200 screen and burning the mixture at a temperature in excess of 2500° F.

5. The process of making refractory furnace linings from dolomite having silica therein, which consists in mixing the dolomite with an iron ore flux, finely dividing the mixture so that much the greater part of it will pass through a screen of approximately 200 openings per linear inch and burning the mixed combination at a temperature in excess of 2500° F. to combine all of the free silica with the calcium and magnesium from the dolomite.

6. The process of preparing refractory furnace lining from dolomite containing silica which consists in finely dividing the dolomite, grinding and homogeneously mixing it with a fluxing material, so that approximately 90% of the mixture will pass through a No. 200 screen and heating to a temperature approximately that of the furnace to be lined to cause combinations chemically between all of the free silica and calcium or magnesium from the dolomite.

7. The step in the method of preparing refractory lining for furnaces from dolomite containing silica, which consists in dividing the dolomite so finely that approximately 90% of the dolomite will pass through a No. 200 screen.

8. The step in the method of preparing refractory lining for furnaces from dolomite containing silica, which consists in homogeneously mixing with a flux and dividing the dolomite and flux so finely that approximately 90% of the dolomite will pass through a No. 200 screen.

BERNARD ENRIGHT.